United States Patent [19]
Kim

[11] Patent Number: 5,441,333
[45] Date of Patent: Aug. 15, 1995

[54] METHOD FOR MAKING CLEANING PAD

[75] Inventor: Ki Il Kim, 826 S. Berendo St., Los Angeles, Calif. 90005

[73] Assignees: Bernard Kuh; Ki Il Kim, both of Los Angeles, Calif.

[21] Appl. No.: 192,963

[22] Filed: Feb. 7, 1994

[51] Int. Cl.⁶ .................... A46B 3/00; B32B 1/10; B32B 31/00
[52] U.S. Cl. .................... 300/21; 29/411; 15/209.1; 156/180; 156/269; 156/288
[58] Field of Search .............. 15/118, 209.1, 229.11; 29/163.6, 411, 412; 300/21; 156/148, 180, 215, 269, 288, 306.9

[56] References Cited

U.S. PATENT DOCUMENTS

| | | | |
|---|---|---|---|
| 3,639,970 | 2/1972 | Larkin | 29/411 |
| 3,807,015 | 4/1974 | Steger | 29/411 X |
| 4,052,238 | 10/1977 | Botvin | 156/148 |
| 4,168,863 | 9/1979 | Hatcher | 300/21 |
| 4,287,633 | 9/1981 | Gropper | 15/209 |

FOREIGN PATENT DOCUMENTS 524453 8/1940 United Kingdom .

Primary Examiner—Timothy V. Eley
Attorney, Agent, or Firm—Lyon & Lyon

[57] ABSTRACT

A flexible, shape conforming pad for use in cleaning, smoothing or finishing. The pad has an abrasive cover and an absorbent core. The edges of the core are anchored to the edges of the cover by compressing and heat sealing the core's edges between the cover's edges. The cover is fabricated from an abrasive material or a combination of different materials. When a combination of the materials is used, the different materials cover separate areas of the pa to provide different surfaces. The fabrication of the cleaning pad is automated, and a plurality of the cleaning pads are fabricated at the same time by a plurality of sealing and cutting devices which simultaneously compress and heat seal spaced strips of the uncut cover and core blank and then the compressed strips are cut to form plural cleaning pads. In the fabrication method using two different materials, all four edges of the cleaning pad are heat sealed.

13 Claims, 3 Drawing Sheets

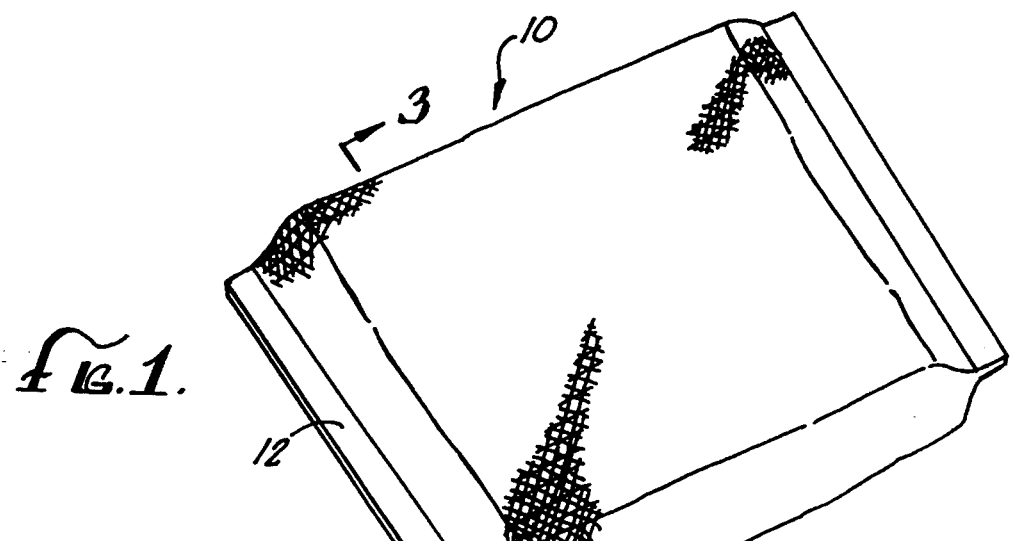
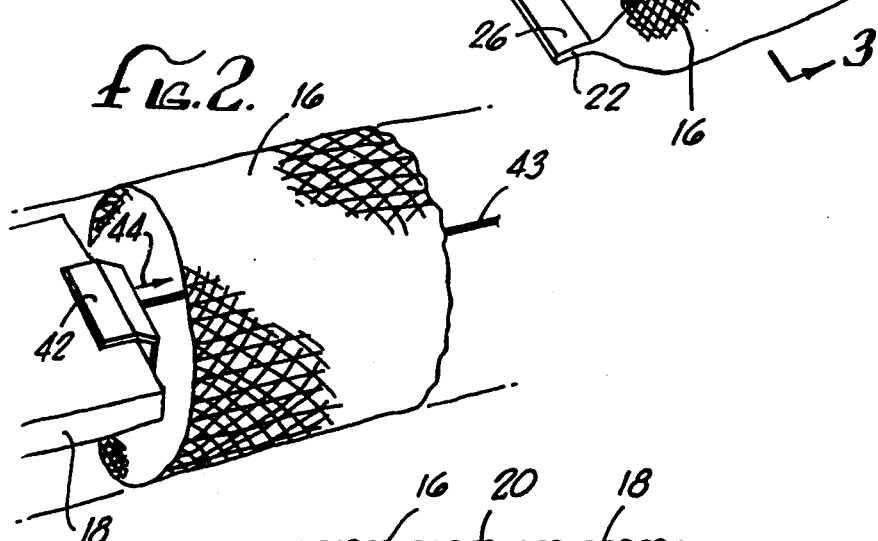
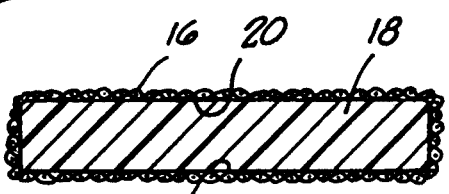
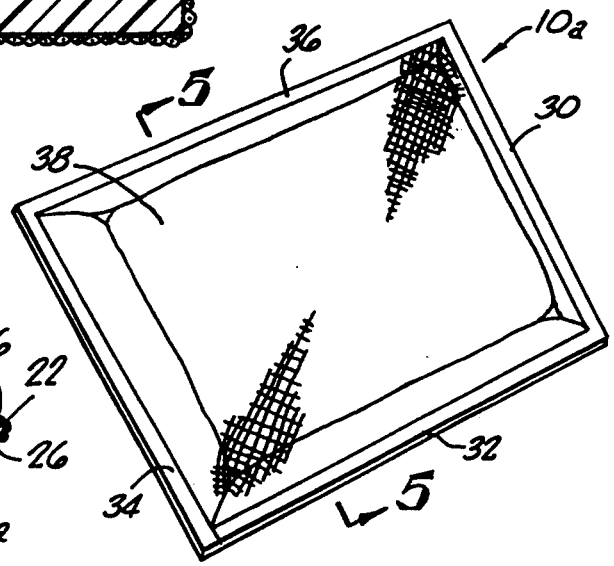
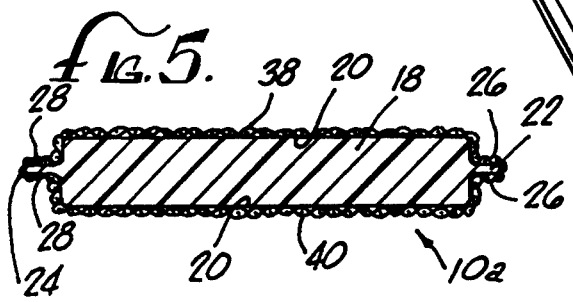

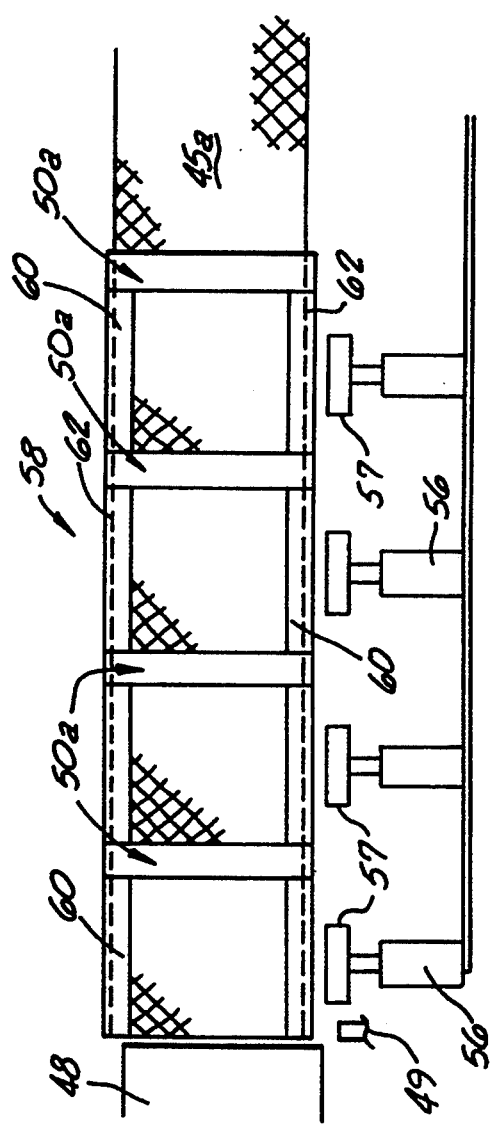

METHOD FOR MAKING CLEANING PAD

BACKGROUND OF THE INVENTION

The field of the present invention is cleaning, smoothing and finishing devices and the methods for their construction.

Abrasive materials are used in many different ways as cleaning agents. A common method of utilizing abrasive materials as a cleaning aid is by surrounding an absorbent core with the abrasive material. This device is commonly known as a scouring or cleaning pad. The typical cleaning pad is formed by knitting a sleeve or sack from an abrasive fiber such as plastic or metal or a combination of the two. A sponge core is then inserted into the knitted sack, and the open end or ends of the sleeve or sack are closed by stitching or heat sealing. As currently manufactured, the durability and efficiency of the cleaning pad during use are reduced by the lack of close contact between the sponge core and the sack and because the sponge core tends to pull away from the perimeter of the sack bunching up in one part of the sack. The asymmetrical position of the sponge core within the sack causes excessive and localized wear of the sack and distortion of the sponge core Further, the cleaning pads currently available have the same coarse material on the entire outer surface of the cleaning pad. Therefore, the cleaning pad has only one degree of abrasiveness and is abrasive not only to the object on which it is being used but also on the hands and fingers of the user.

Though cleaning pads have been used and manufactured for many years, the current cleaning pad fabrication process suffers from inefficiencies. Even though cleaning pads are consumed in large quantities, they are fabricated one at a time, and the fabrication process includes automated steps. For example, the sponge cores are inserted by hand, and the cleaning pad may be inserted by hand into the stitching or heat sealing apparatus.

SUMMARY OF THE INVENTION

The present invention is directed to an improved cleaning pad and an improved method of making same.

An object of this invention provide a method for automatically and efficiently manufacturing cleaning pads of an improved quality.

Another object of this invention is to provide a cleaning pad wherein the outer covering of the cleaning pad is made up of one material covering a portion of the cleaning pad's surface area and another material covering the cleaning pad's remaining surface area whereby two different degrees of smoothness or abrasiveness are provided and an absorbent core is enclosed between the two different mate rials.

Still another object of this invention is to provide a cleaning pad wherein at least two outer edges of the absorbent core are sealed between the outer edges of the cover material by heat and by the absorbent core being compressed between the outer edges of the cover material and heated until a bond is formed between the absorbent core and the cover material.

A still further object of this invention is to provide a method for fabricating the cleaning pad wherein the outer covering for the cleaning pad is an elongated sleeve knitted of an abrasive thread, filament or strip, an elongated absorbent core is fed into the sleeve, the sleeve and absorbent core are fed into a machine where a length of the sleeve-core combination is held in position while a plurality of spaced locations are compressed and heated in strips thereby permanently sealing the absorbent core to and inside the sleeve, and then the sleeve-core combination is separated into multiple cleaning pads by cutting near the center of each compressed and sealed strip.

Other and further objects and advantages of this invention will appear from the following description of preferred embodiments and the accompanying drawings.

BRIEF DESCRIPTION OF THE DRAWINGS

FIG. 1 is a perspective view of a cleaning pad of this invention wherein the pad is heat sealed on two ends.

FIG. 2 is an a perspective view of an absorbent core being automatically inserted into a knitted mesh sleeve.

FIG. 3 is a cross-sectional view of the cleaning pad taken along line 3—3 of FIG. 1.

FIG. 4 is a perspective view of a cleaning pad of this invention which has been heat sealed around its circumference.

FIG. 5 is a cross-sectional view of the cleaning pad of FIG. 4 taken along line 5—5 illustrating a top plan view diagrammatically illustrating he two of the heat sealed edges.

FIG. 8 is a top plan view, similar to FIG. 6 illustrating the four-side heat sealing apparatus for practicing the method of this invention with a cleaning pad blank inserted into it.

DETAILED DESCRIPTION OF THE PREFERRED EMBODIMENTS

Figure 6:
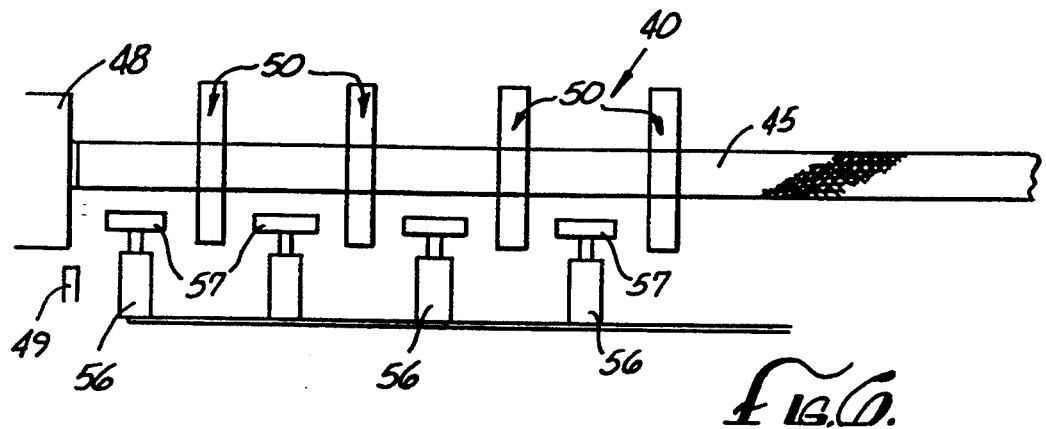
FIG. 6 is a top plan view diagrammatically illustrating the apparatus for practicing the method of this invention with a cleaning pad blank inserted into it.

Referring to the drawings, FIG. 1 illustrates a cleaning pad, generally designated 10, of this invention that is heat sealed on two edges 12, 14. In the preferred embodiment, the cover 16 of the cleaning pad is an abrasive knitted mesh sleeve or tube constructed from one or a combination of threads or strips of materials including Mylar, polyester, nylon, aluminum and other metal fibers. The cover 16 is flexible, porous, wear resistant, and conforms to all shapes for cleaning in small cracks and odd shaped spaces. The outwardly facing part of the cover 16 is adapted for dislodging food from cooking utensils or for any type of cleaning, smoothing and sanding purpose.

The preferred core 18 of he cleaning pad 10, shown in cross section in FIG. 3, is flexible, porous and resilient, and it may be natural or synthetic, such as polyurethane. The sponge core 18 effectively retains soap and fluid for distribution through the porous cover 16 while the outward facing surface of the cover 16 serves used to scour or abrade an article being cleaned, to remove food particles from pans and utensils. In the preferred embodiment shown, the cleaning pad 10 is rectangular in shape; however the cleaning pad 10 may be of any shape, such as circular, square or triangular for example. The sponge core 18 is of a size relative to the size of the cover 16 to fill the cover 16 and firmly contact each inside wall 20 of the cover 16. The contact between the inside walls 20 of the cover 16 and the core 18 is further fixed by the compression and eat sealing of the ends of the sponge core 18 between the ends of the cover 16 along the edges 12, 14 as will be described more fully below.

In another embodiment of he invention shown in FIG. 4, the cleaning pad 10 is heat sealed on all four edges 30, 32, 34, 36 in a method that will be described below. The compressed and heat sealed portion of the cover 16 and sponge core 18 extends around the circumference of the cleaning pad 10a. As shown in FIG. 5, the ends 22, 24 of the sponge core 18 are compressed between the ends 26, 28 of the cover 16, with the two cover ends 26 sealed together and the two cover ends 28 sealed together. This embodiment of the cleaning pad 10a anchors the core 18 to all the outer edges 30, 32, 34 36 of the cleaning pad 10a. Because the core 18 is anchored to the cover 16 all the way around the circumference of the cleaning pad 10a, the core 18 does not shift relative to the cover 16 during use. Thus, preventing localized wear and reducing wear overall to the cover 16 by providing a larger area 0f application and preventing the core 18 from being worn away by the abrasive cover 16. The sponge core 18 is also prevented from bunching up in one portion of the cover 16 where its shape can become distorted. Therefore, the cleaning pad experiences longer life, more even wear during use, and retains its shape.

The alternate embodiment of FIG. 4 and FIG. 5 provides a further improvement option. The first side 38 of the cleaning pad 10a can be made of the course materials referenced above while the opposite side 40 of the cleaning pad 10a can be made of a softer or smoother material. Therefore, this embodiment provides the abrasiveness needed for scrubbing and provides a surface that is more comfortable to hold onto with a bare hand. This embodiment provides a cleaning pad that is easier to use because it is less damaging to, the hands of the user. As a further alternative, the material of the two sides 38, 40 may be of two different degrees of abrasiveness or other texture for allowing the selection of the side that is best suited for a particular scouring, cleaning Or sanding job.

The above described cleaning pad devices are formed by the following process. The two compressed edges 12, 14 of the cleaning pad 10 in FIG. 1 and the four compressed edges 30, 32, 34, 36 in FIG. 4, are formed by compressing the sponge core 18 between the two opposing outer layers of the cover 16 and applying appropriate heat to the compressed portion to permanently heat seal or fuse the two layers of cover together. Referring to FIG. 5, it can be seen that the sponge core 18 is compressed between the cover and is held there permanently. It should be noted that in FIG. the pairs of ends 26, 28 of cover material are shown as being separated for illustrating the presence of the sponge edges 22, 24, but actually the pairs of ends 26, 28 would be fused together to form edges 32, 36.

The cleaning pad 10 of FIG. 1 is fabricated by the process shown in FIG. 2, FIG. 6, and FIG. 7a-c. Equal lengths of the cover 16 and the sponge core 18 are assembled by, for example, inserting a wire or rod 43 having a clamp 42 on one end through the cover 16, attaching the clamp 42 to the sponge core 18, and pulling the sponge core 18 into the cover 16, in the direction shown generally by the arrow 44 of FIG. 2. Preferably the lengths of sponge core 18 and cover 16 are extremely long, such as 100 feet or more, or they may be assembled continuously by knitting the cover 16 around a continuously formed or provided sponge core 18. The cover 16 With the sponge core 18 inserted therein (hereinafter referred to as the cleaning pad blank 45) is then fed to the apparatus generally designated 46, shown diagrammatically in FIG. 6. The apparatus 46 compresses a plurality of narrow strips of cleaning pad blank 45, seals the strips with heat, and cuts each strip to form a plurality of the cleaning pads 10, as described below.

Figure 7A:
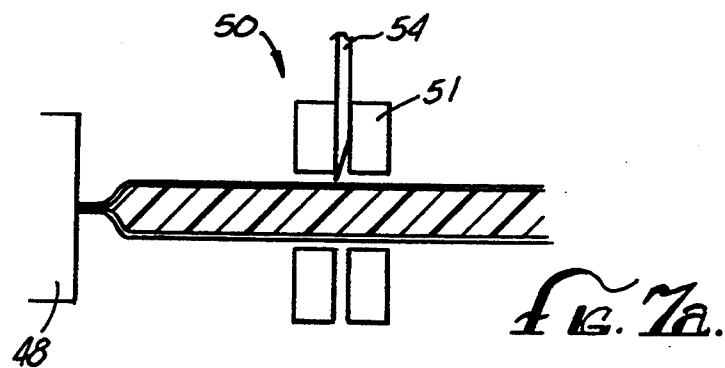
FIG. 7a is a diagrammatic elevation view of one of the heat sealing and cutting devices of the apparatus of FIG. 6 before the cleaning pad blank is engaged.
Figure 7B:
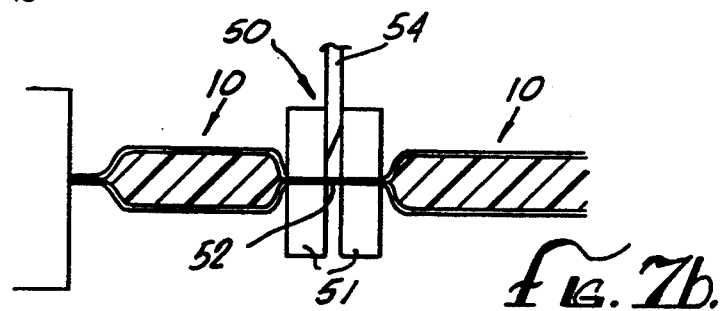
FIG. 7b is a view similar to FIG. 7a illustrating the device after the heating elements have engaged the cleaning pad blank but before the cleaning pads are cut.
Figure 7C:
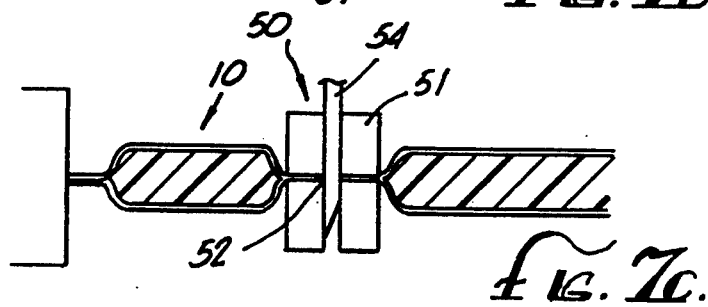
FIG. 7c is a view similar to FIGS. 7a and 7b illustrating the device after the cleaning pads are cut.

The cleaning pad blank 45 is fed into the apparatus 46 until it reaches the stop 48 which assures that the cleaning pads are of uniform size. When the cleaning pad blank 45 reaches the stop 48, an electronic eye 49 sense the cleaning pad blank's presence and begins the operation of the apparatus 46. During the feeding of the cleaning pad blank 45 into the apparatus 46, the sealing and cutting devices, generally designated 50, are retracted as shown in FIG. 7a. Each sealing and cutting device 50 includes a pair of spaced heating element s 51 above the cleaning pad blank 45 and another pair of spaced heating elements 51 below the blank 45 with a knife blade mounted between the upper pair of spaced heating elements 51. The upper and lower heating elements 51, operated by pneumatics or other convenient means, are then brought together compressing n arrow strips 52 of the cleaning pad blank 45 across the blank, as shown in FIG. 7b. The heating elements 51 are preheated by an electrical current to the appropriate temperature for fusing the material of the cover thereby heating the compressed strips 52 of the cleaning pad blank 45 and fusing the opposite sides of the cover 16 together. After a sufficient amount of time has passed to cause the fusion, the blade 54, also operated pneumatically or by other means, is forced downward cutting the cleaning pad blank 45 substantially in the center of the compresse d strips 52, as shown in FIG. 7c. Each heating element 51 is of approximately the same width (horizontally as view in FIGS. 7a, 7b and 7c) and extends laterally beyond each side of the cleaning pad blank 45. Therefore, the compressed strips 52 extend all the way across the blank 45 and are always cut near the center of each strip 52. The cut does not need to be in the exact center of the compressed strip 52 but rather it is only necessary that enough of the compressed strip 52 is left on either side of the cut to assure that the heat seal is permanent and sufficiently strong. As an alternative, the compressed strips 52 of the cleaning pad blank 45 may be cut by a super-heated element, such as a wire, which melts through the compressed cover and sponge core. After the cleaning pads are cut, the heating elements 55 are retracted to the position shown in FIG. 7a. The newly fabricated cleaning pads are then ejected from the apparatus 46 by the cleaning pad removers 56. In the preferred embodiment, the cleaning pad removers 56 shoot a burst of air which blows the cleaning pads 10 out of the apparatus, but the cleaning pad removers 56 may also be pneumatic cylinders which push the cleaning pads out of the apparatus 46. If pneumatic cylinders are used, large area rams 57 are attached to the end of the cylinders. The large area of the rams 57 provides sufficient contact with the cleaning pads to assure their ejection from the apparatus 46. While only four sealing and cutting devices 50i are shown in FIG. 6, it is to be understood that a greater number of devices 50 may be included in apparatus 46 for simultaneous making more cleaning pads 10.

The fabrication of the cleaning pad 10a shown in FIG. 4 and FIG. 5, is accomplished in the above stated manner by the apparatus, generally designated 58, diagrammatically shown in FIG. 8. The apparatus 58 has the same components as the apparatus 46 except that each sealing and cutting device 50a has a pair of side heating elements 60 located on either side. The cleaning pad blank 45a is fed into the apparatus 58 and the two lateral edges 62 of the cleaning pad blank 45a and the narrow strips extending across the blank 45a are compressed and sealed with heat. Each of the edges 62 of the cleaning pad 10 is shown in phantom and each edge 62 is within the outside edge of the side heating elements 60.

This method of fabrication of cleaning pad 10a, as shown in FIG. 8, permits the cleaning pad blank 45a to be the same as blank 45, i.e. a sponge core 18 in a tubular sleeve cover 16, or to be comprised of a sponge core 18 with two separate layers or sheets, top and bottom, of material forming the cover 16. This allows the use of two different materials for the cover which may be of different textures, colours, weaves, etc. Moreover, this method readily lends itself to automatic and continuous production by merely feeding the two materials and the sponge core from rolls without the necessity of pulling a length of sponge through a sleeve or knitting the sleeve around the sponge for forming the cleaning pad blank 45.

Thus, a method for fabricating cleaning pads is disclosed which is capable of fabricating a plurality of cleaning pads at once. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A method for the fabrication of cleaning pads comprising the steps of continuously knitting an abrasive mesh tube, continuously feeding into said mesh tube an absorbent element thereby forming a blank, feeding said blank into a compressing and heating apparatus, compressing a plurality of strips of said blank between a plurality of spaced heating elements for heating said strips to seal opposite sides of said mesh tube together, and cutting! g said blank at each said strip thereby forming plural separate pads.

2. The method of claim 1 including the step of forming each said strip by a pair of closely spaced said heating elements, and said cutting is per,formed between said pair of closely spaced heating elements at each strip.

3. The method of claim 1 further comprising the step of ejecting said pads from said apparatus.

4. The method of claim 1 further comprising the step of feeding said blank into said apparatus until said blank contacts a stop.

5. The method of claim 4 further comprising the steps of automatically sensing the presence of said blank against said stop and beginning said steps of compressing, heating, and cutting said pads when said presence is detected.

6. A method for fabrication of cleaning pads comprising the steps of pulling a long length of tubular cover of abrasive knitted material over a long length of absorbent core of substantially the same length for forming a blank of substantial length, feeding the blank into a processing apparatus, simultaneously heat sealing a plurality of spaced strips of upper and lower portions of the cover together with the sponge core sealed therebetween and with each strip extending laterally across the cover, and cutting across the cover at substantially the center of each strip for forming a plurality of separate cleaning pads having a portion of a strip on each end for closing the cover and securing the core to the cover.

7. The method of claim 6 wherein the step of cutting each strip is performed while the step of heat sealing is being accomplished.

8. The method of claim 6 wherein the heat sealing of each strip is performed by a pair of closely spaced heating means and the cutting step is performed between the heating means.

9. A method of fabricating cleaning pads comprising the steps of feeding a substantial length of cleaning pad blank having an elongated absorbent core at least substantially enclosed by an elongated cover of abrasive material into a processing apparatus, simultaneously heat sealing a plurality of spaced strips of upper and lower portions of the cover together with the sponge core sealed therebetween and with each strip extending laterally across the cover, and cutting across the cover at substantially the center of each strip for forming a plurality of separate cleaning pads having a portion of a strip on each end for closing the cover and securing the core to the cover.

10. The method of claim 9 wherein the step of cutting each strip is performed while the step of heat sealing is being accomplished.

11. The method of claim 9 wherein the heat sealing of each strip is performed by a pair of closely spaced heating means and the cutting step is performed between the heating means.

12. The method of claim 9 including the steps of feeding two separate sheets of material to the processing apparatus above and below the absorbent core for forming the upper and lower portions, respectively, of the elongated cover, and heat sealing longitudinal edges of the two sheets together to enclose the absorbent core in the cover.

13. The method of claim 12 wherein the two sheets of material have two different textures.

* * * * *